United States Patent
Das et al.

(10) Patent No.: US 9,483,597 B1
(45) Date of Patent: Nov. 1, 2016

(54) OPPORTUNISTIC CANDIDATE PATH SELECTION DURING PHYSICAL OPTIMIZATION OF A CIRCUIT DESIGN FOR AN IC

(71) Applicant: Xilinx, Inc., San Jose, CA (US)

(72) Inventors: Sabyasachi Das, San Jose, CA (US); Ruibing Lu, Santa Clara, CA (US); Zhiyong Wang, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/667,324

(22) Filed: Mar. 24, 2015

(51) Int. Cl.
*G06F 17/50* (2006.01)

(52) U.S. Cl.
CPC ....... *G06F 17/5068* (2013.01); *G06F 17/5077* (2013.01); *G06F 2217/84* (2013.01)

(58) Field of Classification Search
CPC ........... G06F 17/5068; G06F 17/5077; G06F 2217/84
See application file for complete search history.

(56) References Cited

U.S. PATENT DOCUMENTS

| | | | | |
|---|---|---|---|---|
| 5,659,484 A * | 8/1997 | Bennett | G06F 17/5031 | 716/113 |
| 6,086,631 A * | 7/2000 | Chaudhary | G06F 17/5072 | 716/116 |
| 6,591,407 B1 * | 7/2003 | Kaufman | G06F 17/5068 | 716/114 |
| 6,763,506 B1 * | 7/2004 | Betz | G06F 17/5031 | 438/129 |
| 7,082,584 B2 * | 7/2006 | Lahner | G06F 17/5022 | 716/102 |
| 7,149,992 B2 * | 12/2006 | Chang | G06F 17/5068 | 716/113 |
| 7,178,118 B2 * | 2/2007 | Ramachandran | G06F 17/5031 | 716/112 |
| 7,203,919 B2 * | 4/2007 | Suaris | G06F 17/5031 | 716/108 |
| 7,207,020 B1 * | 4/2007 | Fung | G06F 17/5054 | 716/113 |
| 7,251,800 B2 * | 7/2007 | McElvain | G06F 17/5031 | 716/112 |
| 7,257,800 B1 * | 8/2007 | Singh | G06F 17/5054 | 716/116 |
| 7,653,884 B2 * | 1/2010 | Furnish | G06F 17/5068 | 716/103 |
| 7,725,855 B1 * | 5/2010 | Jang | G06F 17/5054 | 716/113 |
| 8,307,315 B2 * | 11/2012 | Adya | G06F 17/5072 | 716/108 |
| 8,621,408 B2 * | 12/2013 | Iyer | G06F 17/505 | 716/113 |
| 8,713,507 B1 * | 4/2014 | Noice | G06F 17/5068 | 716/111 |
| 8,832,608 B1 * | 9/2014 | Chakrabarty | G06F 17/505 | 716/51 |
| 2010/0199234 A1 * | 8/2010 | Adya | G06F 17/5072 | 716/113 |
| 2015/0213186 A1 * | 7/2015 | Le Bars | G06F 17/5081 | 716/114 |

OTHER PUBLICATIONS

Altera, *Quartus II Handbook Verison 13.1*, QII52005-13.1.0, Nov. 2013, Chapter 12, pp. 12-1 to 12-46, vol. 2: Design Implementation and Optimization, Altera Corp., San Jose, California, USA.

(Continued)

*Primary Examiner* — Naum B Levin
(74) *Attorney, Agent, or Firm* — Robert M. Brush (57) ABSTRACT

In an example, a method of implementing a circuit design for an integrated circuit (IC) includes: placing and routing a logical description of the circuit design to generate a physical description having a plurality of paths, and executing a timing analysis to determine a timing profile of the physical description. The method further includes optimizing the physical description by performing a plurality of iterations of: comparing the timing profile with a timing constraint to select a candidate set of paths having negative slack from the plurality of paths in the physical description; and modifying the physical description based on at least one optimization of a selected path from the candidate set of paths having a most negative slack. The method further includes generating a physical implementation of the circuit design for the IC based on the physical description.

17 Claims, 6 Drawing Sheets

(56) References Cited

OTHER PUBLICATIONS

Altera, *Quartus II Handbook Version 13.1*, QII52007-13.1.0, Nov. 2013, Chapter 16, pp. 16-1 to 16-16, vol. 2: Design Implementation and Optimization, Altera Corp., San Jose, California, USA.
Murgai, Rajeev et al., "An Improved Synthesis Algorithm for Multiplexor-based PGA's" *Proc. of the 29$^{th}$ ACM/IEEE Design Automation Conference*, Jun. 8, 1992, pp. 380-386, ACM Digital Library, http://dl.acm.org/citation.cfm?id=149498.
Senouci, Sid-Ahmed, Physical Synthesis for CPLD Architectures, *Proc. of the 2nd Conférence Internationale sur l'informatique et ses Applications* (CIIA'09), May 3, 2009, vol. 547, pp. 1-9, CEUR Workshop Proceedings, http://ceur-ws.org.
Singh, Deshanand et al,. "Two-Stage Physical Synthesis for FPGAs" *Proc. of the IEEE 2005 Custom Integrated Circuits Conference*, Sep. 18, 2005, pp. 171-178, IEEE, Piscataway, New Jersey, USA.
Sun, Welson et al., "Combining Module Selection and Resource Sharing for Efficient FPGA Pipeline Synthesis," *Proc. of the 2006 ACM/SIGDA 14$^{th}$ International Symposium on Field Programmable Gate Arrays*, Feb. 22, 2006, pp. 179-188, ACM Digital Library, http://dl.acm.org.
Sun, Welson et al., "FPGA Pipeline Synthesis Design Exploration Using Module Selection and Resource Sharing," *IEEE Transactions on Computer-Aided Design of Integrated Circuits and Systems*, Feb. 2007, pp. 254-265, IEEE, Piscataway, New Jersey, USA.
Synopsys, *Synplify Premier*, 2011, pp. 1-4, Synopsys, Inc., Mt. View, California, USA, http://www.synopsys.com/Tools/Implementation/FPGAImplementation/Documents/synpremier-brochure.pdf.
Ye, Terry Tao et al., "Physical Synthesis for ASIC Datapath Circuits," *Proc. of the 2002 IEEE International Symposium on Circuits and Systems*, May 26, 2002, pp. III-365 to III-368, vol. 3, IEEE, Piscataway, New Jersey, USA.

\* cited by examiner

OPPORTUNISTIC CANDIDATE PATH SELECTION DURING PHYSICAL OPTIMIZATION OF A CIRCUIT DESIGN FOR AN IC

TECHNICAL FIELD

Examples of the present disclosure generally relate to electronic circuit design and, in particular, to opportunistic candidate path selection during physical optimization of a circuit design for an integrated circuit (IC).

BACKGROUND

Circuit designs for integrated circuits (ICs) can be generated using a variety of techniques. In some examples, designers can write register-transfer level (RTL) code, write program-language code, create schematic representations, or a combination thereof to design a circuit for implementation in a target IC device. The target IC device can be a programmable IC, such as a field programmable gate array (FPGA), a mask-programmable IC, such as an application specific integrated circuit (ASIC), or the like. In the design flow, a designer creates a description of the circuit design, which is then processed through one or more steps that transform the description into a physical implementation of the circuit design for a target IC device.

In modern IC design, designing a circuit to meet timing performance goals (i.e., operating frequency goals) is one of the most challenging issues faced by designers. Circuit designers spend significant time and energy to have their designs meeting timing goals. Often times, place, route, and physical optimization tools are not effective at identifying the bottleneck paths in the circuit design that can be optimized to improve timing performance. Moreover, when processing a placed and routed circuit design for an IC, traditional physical optimization tools can suffer from long run times, making them impractical to use.

SUMMARY

Techniques for opportunistic candidate path selection during physical optimization of a circuit design for an integrated circuit (IC). In an example, a method of implementing a circuit design for an integrated circuit (IC) includes placing and routing a logical description of the circuit design to generate a physical description having a plurality of paths. The method further includes executing a timing analysis to determine a timing profile of the physical description. The method further includes optimizing the physical description by performing a plurality of iterations of: comparing the timing profile with a timing constraint to select a candidate set of paths having negative slack from the plurality of paths in the physical description; and modifying the physical description based on at least one optimization of a selected path from the candidate set of paths having a most negative slack. The method further includes generating a physical implementation of the circuit design for the IC based on the physical description.

Further embodiments include a non-transitory computer-readable storage medium comprising instructions that cause a computer system to carry out the above method above, as well as a computer system configured to carry out the above method.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated, or if not so explicitly described.

Techniques for opportunistic candidate path selection during physical optimization of a circuit design for an integrated circuit (IC) are described. In an example, physical optimization is performed on a placed and routed circuit design ("post-route physical optimization"). Often times, traditional place and route of a circuit design is not able to meet established timing requirements. Post-route physical optimization can be used in an attempt to eliminate or mitigate timing constraint violations ("timing-closure") by optimizing timing path(s) in the placed and routed design. In order to reduce runtime of post-route physical optimization, an opportunistic candidate selection approach is employed to select which negative slack timing paths are to be optimized. The opportunistic candidate selection process allows post-route physical optimization to become feasible from a runtime standpoint, which results in significant improvement in quality of results (QoR) and timing-closure.

In particular, the opportunistic candidate path selection technique described herein identifies important timing paths in the design that will most benefit from optimization. The approach can handle circuit designs with many clock groups and can be applied to all timing-critical circuit designs, independent of their content. Further, the approach is not dependent on any particular optimization technique and thus various types of optimizations can be performed on the selected timing paths. The technique can be fully automated and incorporated into the design flow after place and route of the circuit design. These and further aspects of the present disclosure are discussed below.

Figure 1:
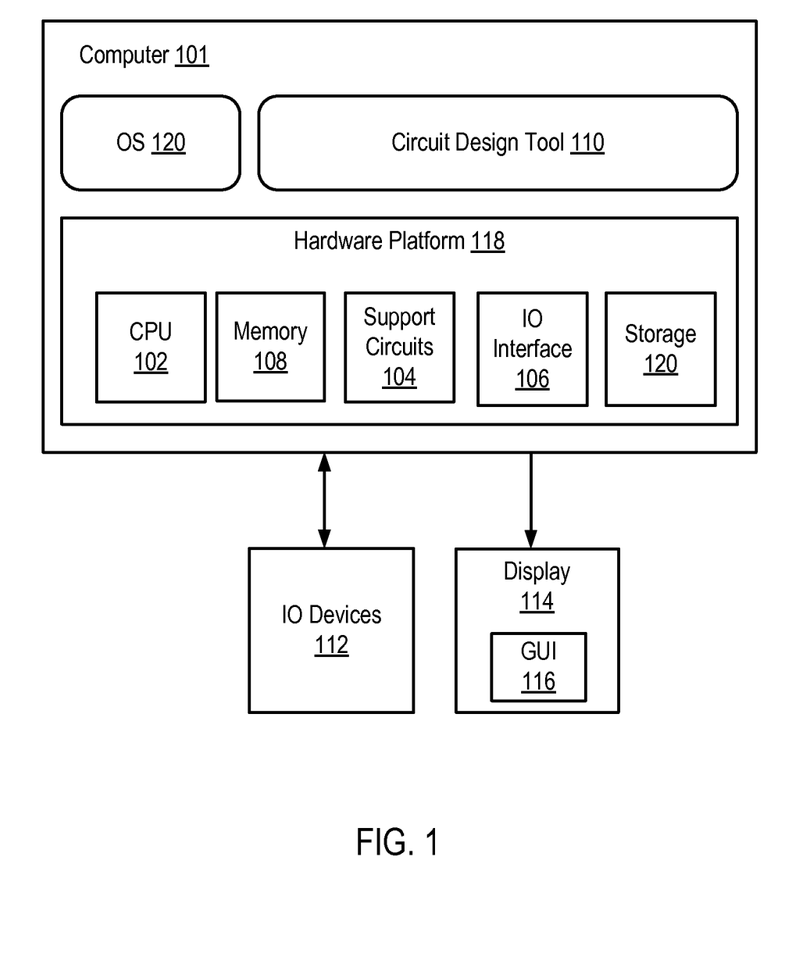
FIG. 1 is a block diagram depicting an example of a circuit design system.

FIG. 1 is a block diagram depicting an example of a circuit design system 100. The circuit design system 100 includes a computer 101 coupled to input/output (IO) devices 112 and a display 114. The computer 101 includes a hardware platform 118 can include conventional components of a computing device, such as a central processing unit (CPU) 102, system memory 108, various support circuits 104, storage 120, and an 10 interface 106. The CPU 102 can include one or more microprocessors. The CPU 102 is configured to execute instructions that perform one or more operations described herein. The instructions can be stored in system memory 108, storage 120, or any other memory in the hardware platform 118 (e.g., cache memory). The system memory 108 includes devices that store information and can include, for example, random access memory (RAM), read-only memory (ROM), or a combination thereof. The storage 120 includes local storage devices, such as hard disks, flash memory modules, solid state disks, optical disks, and the like. The storage 120 can also include interface(s) configured for communication with one or more network data storage systems. The support circuits 104 can include conventional cache, power supplies, clock circuits, data registers, 10 interfaces, and the like. The 10 interface 106 includes conventional interfaces to the computer 101 known in the art. The 10 interface 106 can be coupled to the 10 devices 112, which can include conventional keyboard, mouse, and the like. The 10 interface 106 can also be coupled to the display 114, which can present a GUI 116 to a user.

The computer 101 further includes a software platform comprising an operating system (OS) 122 and a circuit design tool 110. The OS 122 and the circuit design tool 110 include instructions that are executed by the CPU 102. The OS 122 can include any known operating system, such as Linux®, Microsoft Windows®, Mac OS®, and the like. The circuit design tool 110 is an application that executes within the OS 122, which provides an interface to the hardware platform 118. Operation of the circuit design tool 110 is discussed below. An example circuit design tool that can be adapted to include the techniques described herein is the Vivado® Design Suite available from Xilinx, Inc. of San Jose, Calif., although other circuit design tools can be similarly adapted.

Figure 2:
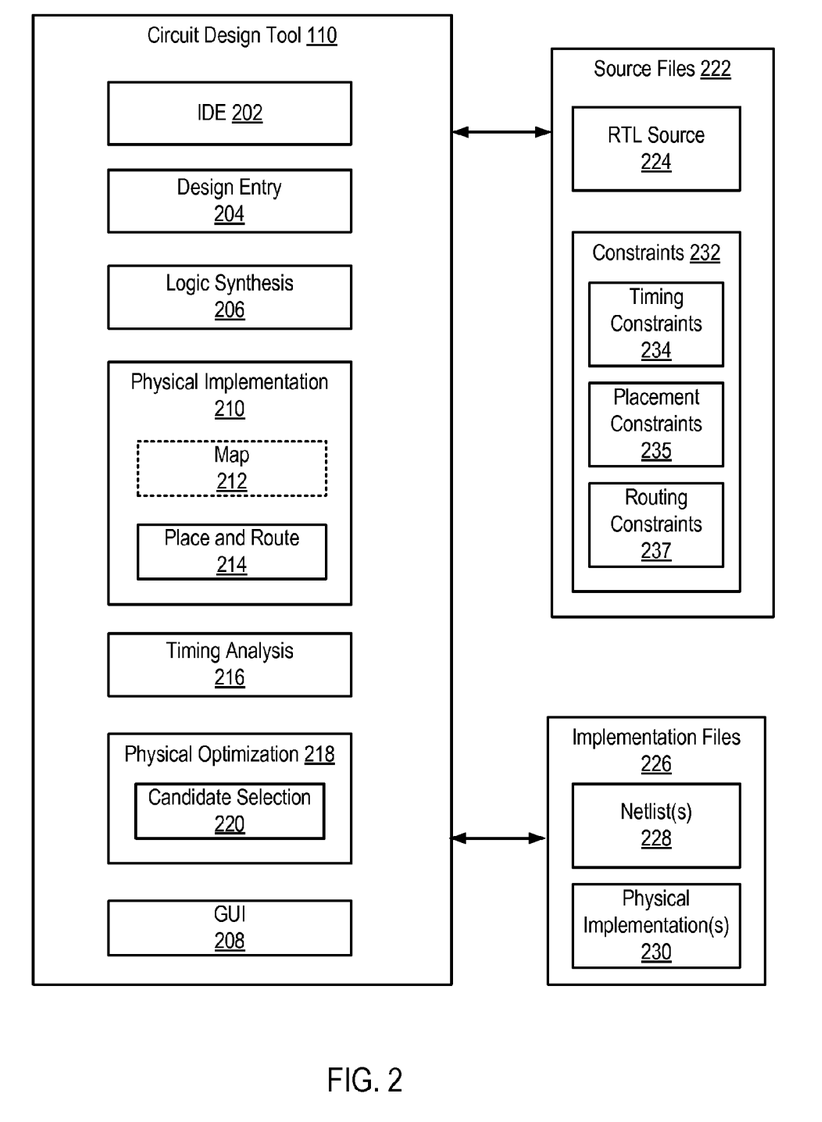
FIG. 2 is a block diagram showing an example of a circuit design tool in the circuit design system of FIG. 1.

FIG. 2 is a block diagram showing an example of the circuit design tool 110. The circuit design tool 110 includes an integrated development environment (IDE) module 202, a design entry module 204, a logic synthesis module 206, a physical implementation module 210, a timing analysis module 216, a physical optimization module 218, and a graphical user interface (GUI) module 208. The modules 202, 204, 206, 208, 210, 216, and 218 are just one example implementation of the circuit design tool 110. The functions performed by the modules 203, 204, 206, 208, 210, 216, and 218 described herein can be performed by a different configuration of one or more modules in the circuit design tool 110. The modules in the circuit design tool 110 can be implemented by circuitry that is part of an electronic system, by firmware in the electronic system, by software in the electronic system, or by a combination thereof. An example electronic system in which the circuit design tool 110 can be implemented is described above in FIG. 1.

In general, the circuit design tool 110 generates an abstract description of the circuit design, which is processed into a physical description of the circuit design for implementation in a target IC ("target hardware"). The circuit design tool 110 can process the abstract description of the circuit design through various intermediate transformations to produce the physical implementation of the circuit design. For a programmable IC (e.g., a field programmable gate array (FPGA)), a physical implementation of a circuit design can be formatted and loaded into the programmable IC to produce a physical circuit. Example FPGAs that can be used as a target IC include Spartan®, Artix®, Kintex®, and Virtex® series FPGAs available from Xilinx, Inc., although other types of FPGAs can also be used. For a masked-programmable IC (e.g., an application specific integrated circuit (ASIC)), a physical implementation of a circuit design can be formatted to generate a mask set. Thus, the circuit design tool 110 transforms an abstract representation of the circuit design (the abstract description) into a physical representation of the circuit design (the physical description) that can be formatted to binary data (the physical implementation) that can be used to realize physical circuits in the target hardware.

A user can interact with the circuit design tool 110 to specify source files 222. The source files 222 can include register-transfer level (RTL) source 224 and constraints 232. The RTL source 224 includes one or more files specifying the circuit design at various levels of abstraction, such as a high-level block model of the circuit design, a lower level hardware description language (HDL) model of the circuit design, or the like. In general, the RTL source 224 has little or no dependence on the target hardware. The constraints 232 include one or more files specifying constraints on the circuit design. In particular, the constraints 232 include timing constraints 234 that specify timing performance requirements of the circuit design (e.g., operating frequency of particular clocks, maximum input path delays, maximum output path delays, etc). The constraints 232 can also include placement constraints 235 and routing constraints 237.

The circuit design tool 110 processes the source files 222 to generate implementation files 226. The implementation files 226 include one or more files specifying the circuit design with varying dependence of the target hardware. For example, the implementation files 226 can include one or more netlists 228 and one or more physical implementations 230. The netlist(s) 228 can include synthesized netlists, placed netlists, placed and routed netlists, and the like. The physical implementations 230 can include configuration bitstreams, mask files, and the like.

The IDE module 202 provides a user interface through the GUI module 208 to assemble, implement, and validate a circuit design for the target hardware. The IDE module 202 controls the overall circuit design process, including invocation of the design entry module 204, the logic synthesis module 206, the physical implementation module 210, the timing analysis module 216, and the physical optimization module 218.

The design entry module 204 generates a functional description of the circuit design in response to user input through the GUI module 208. The functional description can include descriptions for a plurality of circuit components, such as flip-flops, memories, logic gates, processors, and the like, coupled together by connections (referred to as "nets"

or "signals"). The GUI module 208 can include a graphic interface through which a circuit designer connects symbols and blocks representing various components to produce a schematic of the circuit design, which is converted into the RTL source 224. The GUI module 208 can include a text interface through which a user writes HDL code directly to produce the RTL source 224. The GUI module 208 can employ a combination of schematic and text-based entry.

The logic synthesis module 206 produces a logical description of the circuit design from the function description specified in the RTL source 224. The logical description includes a logical representation of the circuit design in terms of specific logic elements. For example, the logic synthesis module 206 can perform "technology mapping" that transforms generic circuit elements into technology-specific circuit elements. For example, the logical description can include a representation of the circuit design in terms of specific logic elements optimized to the architecture of a programmable IC, such as lookup tables (LUTs), carry logic, 10 buffers, and like technology-specific components. In another example, the logical description can include a representation of the circuit design in terms of gates, flip-flops, and the like (sometimes referred to as a "gate-level description"). The logical description can be specified by a netlist 228 (e.g., a synthesized netlist).

The physical implementation module 210 produces a physical description of the circuit design from the logical description. The physical description of the circuit design is physical representation of the circuit design for implementation in a target IC. In an example, the physical implementation module 210 comprises a place and route module 214. The place and route module 214 is places instances of circuit components specified in the logical description within a physical layout of the target IC ("placement"). The place and route module 214 also routes nets between the instances specified in the logical description using wires in the target IC. In an example, the target IC comprises a programmable IC, and the physical implementation module 210 includes a map module 212. The map module 212 maps the instances of circuit components specified in the logical description onto specific types of primitive components defined in the architecture of the target programmable IC (e.g., a configurable logic block (CLB), block RAM (BRAM), IO block (IOB), or the like), which are then placed and routed by the place and route module 214. The physical description can be specified by a netlist 228 (e.g., a placed-and-routed netlist). The physical implementation module 210 can generate a physical implementation 230 from the physical description (e.g., a configuration bitstream for a programmable IC or mask set for an ASIC).

The timing analysis module 216 performs a timing analysis of the logical description and/or physical description of the circuit design. The timing analysis module 216 verifies that the logical description and/or the physical description meet the timing constraints 234 specified by the circuit designer. The timing analysis can include various timing checks to ensure that the circuit design is fully constrained and that the circuit design meets timing requirements (e.g., slack for timing paths) derived in response to the timing constraints 234.

The physical optimization module 218 performs timing-driven optimization on negative-slack timing paths in the physical description of the circuit design. "Slack" is defined as the difference between a constraint and an analyzed value, where "negative slack" indicates an error condition (i.e., the analyzed value does not meet the constraint). A negative-slack timing path is a timing path in the physical description that does not meet a timing constraint. The physical optimization module 218 can invoke the timing analysis module 216 in order to perform timing analysis of the physical description. The physical optimization module 218 needs decide which timing paths in the physical description to attempt to optimize.

The physical description can include a large number of timing paths, and thus it is not feasible for the physical optimization module 218 to operate on all timing paths. Attempting to optimize too many timing paths can lead to congestion, non-convergence, and reduced timing-improvement. Accordingly, the physical optimization module 218 includes a candidate selection module 220. The candidate selection module 220 implements an opportunistic approach to select timing paths for optimization in order to increase the chance of improving timing performance (e.g., frequency). The candidate selection module 220 does not operate on timing paths that have positive slack, which reduces the set of timing paths under consideration and improves run time. Further, the candidate selection module 220 selects particular negative-slack timing paths for optimization that will provide the greatest improvement in terms of physical optimization, further reducing run time and improving QoR. Operation of the candidate selection module 220 is discussed below.

Figure 3:
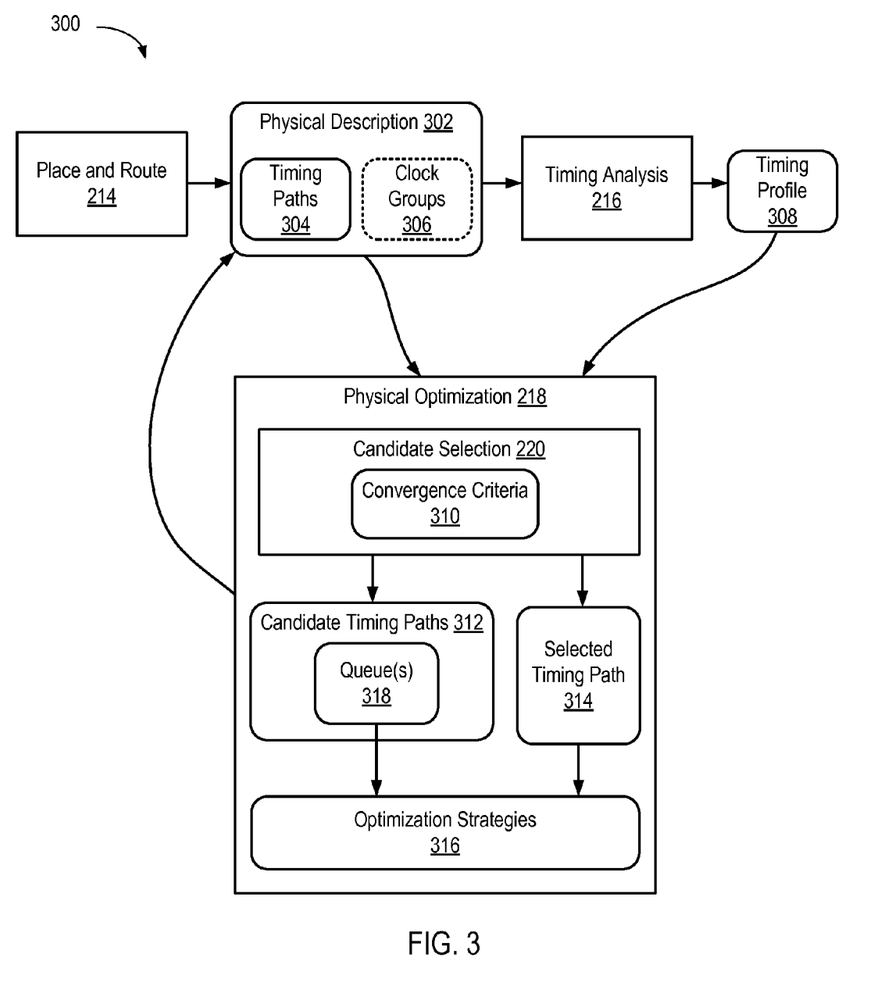
FIG. 3 is a block diagram depicting an example data flow in the circuit design tool of FIG. 2.

FIG. 3 is a block diagram depicting an example data flow 300 in the circuit design tool 110. The place and route module 214 generates a physical description 302 of the circuit design, as described above. The physical description 302 includes timing paths 304 (also referred to herein as paths 304). Before describing the data flow 300, a brief description of timing paths is set forth below with respect to FIGS. 4-5.

Figure 4:
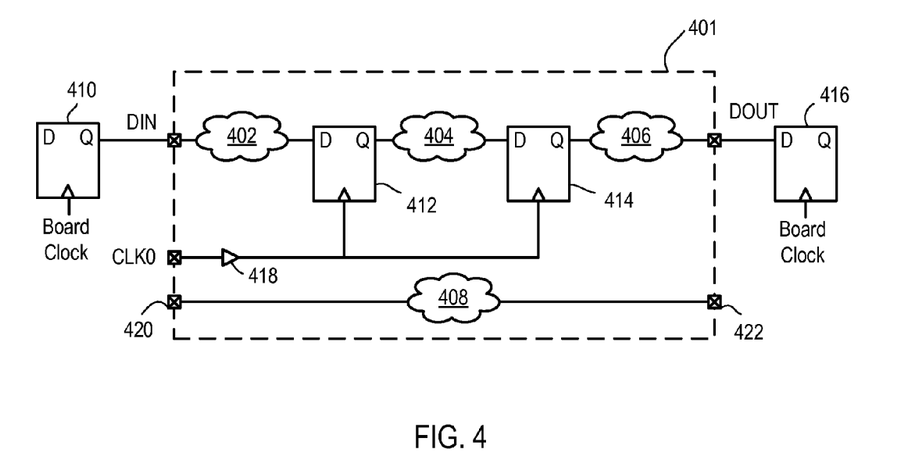
FIG. 4 is a block diagram depicting examples of timing paths that can be specified in a physical description of a circuit design.

FIG. 4 is a block diagram depicting examples of timing paths that can be specified in a physical description of a circuit design. A physical description of a circuit design can specify sequential logic elements, such as flip-flops 412 and 414, within an IC 401. An external port DIN of the IC 401 is coupled to an output of an external flip-flop 410, and an external port DOUT of the IC 401 is coupled to an output of an external flip-flop 416. Clock ports of the external flip-flops 410 and 416 are clocked by an external clock referred to as a "board clock". An external port CLK0 of the IC 401 receives an external clock signal referred to as "CLK0". The clock signal CLK0 is coupled to a clock buffer 418, which couples the clock signal CLK0 to clock ports of the flip-flops 412 and 414. An input of the flip-flop 412 is coupled to the external port DIN through a data path 402. An output of the flip-flop 412 is coupled to an input of the flip-flop 414 through a data path 404. An output of the flip-flop 414 is coupled to the external port DOUT through a data path 406. An external port 420 of the IC 401 is coupled to another external port 422 of the IC 401 through a data path 408.

FIG. 4 shows four different types of timing paths. The timing paths shown in FIG. 4 are just some examples of the types of timing paths that can be present in a physical description of a circuit design. In general, a timing path is formed by a pair of sequential elements controlled by the same clock or by two different clocks. A first timing path is formed by the port DIN, the data path 402, and the flip-flop 412 clocked by the clock signal CLK0. This type of timing path is a path from an input port to an internal sequential logic element. Data is launched outside the IC 401 by an external clock (e.g., board clock), reaches an input port of the IC 401 (DIN), and propagates through a data path (402) before reaching a sequential element clocked by a destination clock (flip-flop 412 clocked by CLK0).

Another timing path is formed by the flip-flop 412 clocked by the clock signal CLK0, the data path 404, and the flip-flop 414 also clocked by the clock signal CLK0. This type of timing path is a path between sequential logic elements in the IC 401. Data is launched inside the IC 401 by a sequential element clocked by a source clock (flip-flop 412 clocked by CLK0), and propagates through a data path (404) before reaching a sequential element clocked by a destination clock (flip-flop 414 clocked by CLK0).

Another timing path is formed by the flip-flop 414 clocked by the clock signal CLK0, the data path 406, and the port DOUT. This type of timing path is a path between a sequential logic element in the IC 401 and an output port to an external sequential logic element. Data is launched inside the IC 401 by a sequential element clocked by a source clock (flip-flop 414 clocked by CLK0), and propagates through a data path (406) before reaching an output port of the IC 401 (DOUT) coupled to an external sequential element clocked by an external clock (flip-flop 416 clocked by board clock).

Another timing path is formed by the port 420, the data path 408, and the port 422. This type of timing path is an in-to-out path from an input port of the IC 401 to an output port of the IC 401. Data is passed through the IC without being latched.

Figure 5:
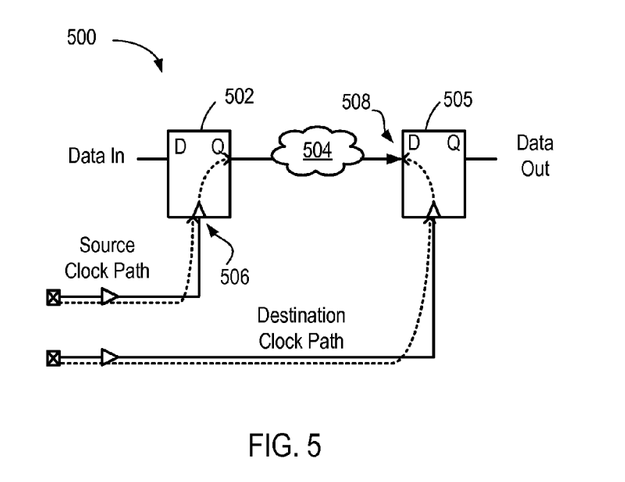
FIG. 5 is a block diagram depicting a more detailed example of a timing path between sequential elements in an IC.

FIG. 5 is a block diagram depicting a more detailed example of a timing path 500 between sequential elements in an IC. The timing path 500 is formed by a flip-flop 502, a data path 504, and a flip-flop 505. An output of a flip-flop 502 is coupled to an input of the flip-flop 505 through the data path 504. A clock port of the flip-flop 502 is coupled to a source clock path, and a clock port of the flip-flop 505 is coupled to a destination clock path. The source and destination clocks can be the same clock, or can be different clocks. The timing path comprises three sections: (1) A source clock path that is a path followed by the source clock from its source point to the clock port of the flip-flop 502 that launches the data on the data path 504; (2) The data path 504 between a start-point 506 and an end-point 508; and (3) A destination clock path that is the path followed by the destination clock from its source point to the clock port of the flip-flop 505 that captures the data from the data path 504. The timing analysis module 216 determines slack at the end-point 508 of the timing path 500. The slack is the difference between a data required time derived from timing constraints and a data arrival time estimated by the timing analysis module 216 at the end-point 508. Data is safely transferred between the flip-flop 502 and the flip-flop 505 if the slack is positive.

Returning to FIG. 3, the physical description 302 can also include clock groups 306. Clock groups 306 can be used to group like clocks together in groups. For example, a clock group 306 can include a clock tree comprising a primary clock and one or more generated clocks generated from the primary clock. Clocks between clock groups 306 can be asynchronous to one another.

The physical description 302 is input to the timing analysis module 216. The timing analysis module 216 generates a timing profile 308 for the physical description 302. The timing profile 308 includes slack values for each of the timing paths 304 in the physical description 302.

The timing profile 308 and the physical description 302 are input to the physical optimization module 218. The candidate selection module 220 processes the timing profile 308 to identify candidate timing paths 312 for optimization. The candidate timing paths 312 comprise timing paths having negative slack as indicated in the timing profile 308. In an example, the candidate timing paths 312 are formed into one or more priority queues 318 (also referred to as "queues 318"). Each of the queues 318 can include one or more candidate timing paths. In one example, the candidate timing paths 312 can be formed into a single queue 318 in order of most negative slack (also referred to as "worst negative slack") to least negative slack. In another example, the candidate timing paths 312 can be formed into a plurality of queues 318. Each of the queues 318 can be associated with a respective one of the clock groups 306. The candidate timing paths 312 in each of the queues 318 belong to one of the clock groups 306. Within each of the queues 318, the candidate timing paths 312 are in order of most negative slack to least negative slack. The candidate timing paths 312 can be organized using other types of data structures known in the art.

The candidate selection module 220 identifies one of the candidate timing paths 312 as the selected timing path 314. The selected timing path 314 is the timing path having the worst negative slack (WNS) of all candidate timing paths 312 ("WNS timing path"). If there are multiple clock groups 306, the selected timing path 314 comprises the WNS timing path across all of the clock groups 306. The WNS timing path is selected for physical optimization, since improvement of the WNS timing path is likely to improve the total negative slack of the entire circuit design, in addition to the WNS timing path itself. Hence, the candidate selection module 220 employs opportunistic candidate selection. The candidate selection module 220 provides the selected timing path 314 to the physical optimization module 218 as parametric input for physical optimization. The physical optimization module 218 can perform one or more physical optimizations on the selected timing path 314 according to one or more optimization strategies 316. The physical optimization module 218 modifies the physical description 302 by applying the optimization strategies 316 to the selected timing path 314. Various optimization strategies 316 can be performed, such as placement optimization, routing optimization, rewiring optimization, clock optimization, retiming optimization, or the like, as well as combinations thereof.

The physical optimization process performed by the physical optimization module 218 can repeat for one or more iterations. At the end any iteration, the candidate selection module 220 can optionally invoke the timing analysis module 216 to re-compute the timing profile 308. That is, the timing analysis module 216 can be invoked after each iteration or after a plurality of iterations. In an example, when invoked, the timing analysis module 216 can re-compute timing of the entire circuit design. Alternatively, when invoked, the timing analysis module 216 can employ an incremental timing analysis that builds on results of the previous timing analysis. The candidate selection module 220 includes convergence criteria 310 that controls when the physical optimization process is complete. In general, the candidate selection module 220 continues invoking the physical optimization module 218 and optionally the timing analysis module 216 until there are no more candidate timing paths 312. In one example, the convergence criteria 310 can dictate that physical optimization is complete if there are no more timing paths with negative slack in the physical description 302. This results in the most optimum physical optimization of the physical description 302.

In another example, the convergence criteria 310 can dictate that if timing performance of a path has not improved from a previous iteration, then that timing path is excluded from the candidate timing paths 312. Timing performance can include setup-time performance, hold-time performance, or both. In such case, the selected timing path 314 becomes the timing path having the next worst negative slack (i.e., the next worst negative slack path of timing paths 304 becomes the WNS timing path in the candidate timing paths 312). If the excluded timing path is associated with other timing path(s) in a clock group 306, the entire group (e.g., queue 318) of timing paths can be excluded from the candidate timing paths 312. This is because if the WNS timing path cannot be improved, then timing paths in the same clock group 306 having less negative slack will not be improved.

In another example, the convergence criteria 310 can dictate that if timing performance of a path as not improved by a threshold amount from a previous iteration, then the timing path is considered "timing-congested." Timing performance can include setup-time performance, hold-time performance, or both. The threshold amount can be dynamically adjusted from one iteration to another based on the slope of the optimization trajectory. If there are multiple clock groups 306, then a unique threshold can be used for each of the clock groups 306. Such a heuristic provides that if after several successful optimization iterations the overall improvement of a specific timing path (or group of timing paths) is "very little", then that timing path (or group of timing paths) is considered timing congested. Using such a heuristic, the candidate selection module 220 can exclude timing-congested paths from the candidate timing paths 312. If the excluded timing path is associated with other timing path(s) in a clock group 306, the entire group (e.g., queue 318) of timing paths can be excluded as timing-congested. This is because if the WNS timing path is timing-congested, then timing paths in the same clock group 306 having less negative slack are also timing-congested.

Figure 6:
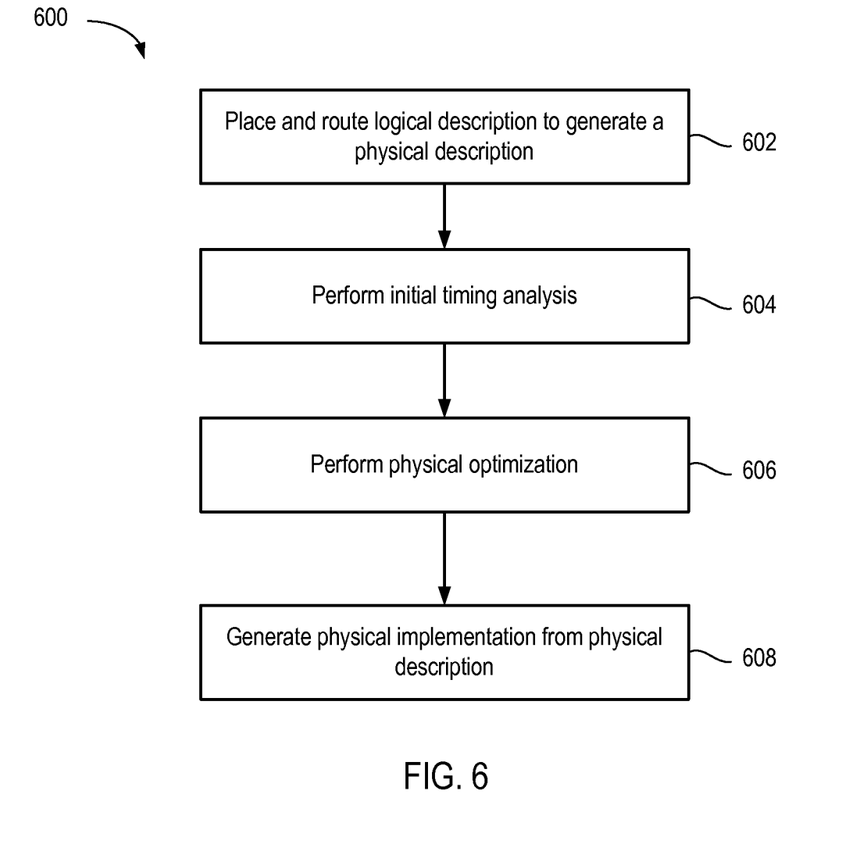
FIG. 6 is a flow diagram depicting an example of a method of implementing a circuit design for an IC.

FIG. 6 is a flow diagram depicting an example of a method 600 of implementing a circuit design for an IC. The method 600 can be performed by the circuit design tool 110. The method 600 begins at block 602, where the place and route module 214 places and routes a logical description of the circuit design to generate a physical description. At block 604, the timing analysis module 216 performs an initial timing analysis of the physical description. At block 606, the physical optimization module 218 performs physical optimization on the physical description based on the initial timing analysis. At block 608, the physical implementation module 210 generates a physical implementation for a target IC from the physical description.

Figure 7:
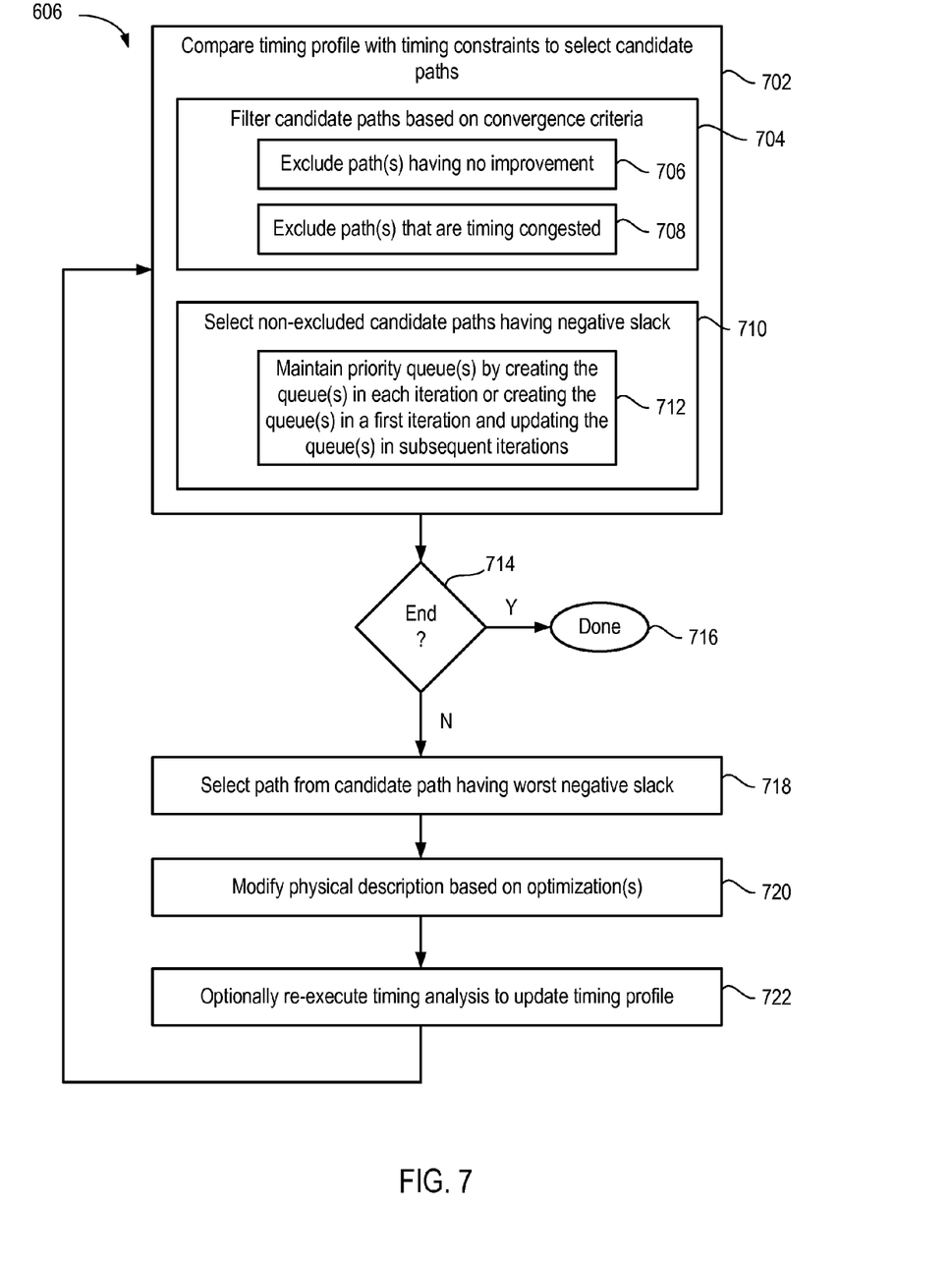
FIG. 7 is a flow diagram depicting an example of a method of performing physical optimization.

FIG. 7 is a flow diagram depicting an example of the block 606 for performing physical optimization. The block 606 can be performed for one or more iterations. The block 606 begins at block 702, where the candidate selection module 220 compares a timing profile with timing constraints to select candidate paths. As discussed above, the candidate paths have negative slack as determined from the timing profile and the timing constraints. The block 702 includes a block 710, where the candidate selection module 220 selects non-excluded candidate paths having negative slack. In an example, the block 710 can include a block 712, where the candidate selection module 220 maintains priority queue(s) by creating the queue(s) in each iteration of the block 606, or creating the queue(s) in a first iteration of the block 606 and updating the queue(s) in subsequent iterations of the block 606.

In an example, the block 702 can include a block 704, where the candidate selection module 220 filters candidate paths based on convergence criteria. For example, the block 704 can include a block 706, where the candidate selection module 220 excludes path(s) having no improvement in timing performance from one iteration to another. The measured timing performance can include setup-time performance, hold-time performance, or both. The block 704 can include a block 708, where the candidate selection module 220 excludes path(s) that are timing congested from one iteration to another. The block 704 can perform block 706, block 708, or both. In another example, block 704 can be omitted and no candidate paths are excluded.

At block 714, the candidate selection module 220 determines whether an end condition is satisfied. In one example, the end condition is satisfied when the set of candidate paths identified in block 702 is empty. In another example, the end condition is satisfied when the set of candidate paths identified in block 702 reaches a threshold number of candidate paths. Alternatively, the end condition can be satisfied when the set of candidate paths is empty or when a threshold number of candidate paths have been processed. For example, a user can invoke a "fast-running" physical optimization flow that includes a target number of paths to process or an acceptable number of un-optimized paths. In yet another example, the end condition can be satisfied when the set of candidate paths is empty or when a threshold time has elapsed. For example, a user can establish a maximum runtime for the physical optimization process.

If the end condition is satisfied, the block 606 ends at block 716. Otherwise, the block 606 proceeds to block 718. At block 718, the candidate selection module 220 selects a path from the set of candidate paths having the worst negative slack. At block 720, the candidate selection module 220 invokes the physical optimization module 218 to modify the physical description based on one or more optimization(s) of the selected path. At block 722, the candidate selection module 220 optionally invokes the timing analysis module 216 to re-execute timing analysis to update the timing profile. The block 606 begins again at block 702.

Techniques for opportunistic candidate path selection during physical optimization of a circuit design for an IC have been described. The candidate path selection technique is dynamic and reacts to the changing timing performance of the circuit design during physical optimization. The opportunistic candidate selection process allows post-route physical optimization to become feasible from a runtime standpoint, which results in significant improvement in QoR and timing-closure. The techniques described herein improve physical description of the circuit design and have a significant technical effect on the physical implementation of the circuit design and, ultimately, the realized physical circuit. Moreover, the techniques described herein improve the run time of the circuit design tool and hence improves the functionality of the electronic system that implements the circuit design tool (e.g., computer system).

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more example implementations may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific examples, other and further examples may be devised without departing from the basic scope thereof, and the scope thereof is determined by the claims that follow.

What is claimed is:

1. A method of implementing a circuit design for an integrated circuit (IC), comprising:
    placing and routing a logical description of the circuit design to generate a physical description having a plurality of paths;
    executing a timing analysis to determine a timing profile of the physical description, the timing profile including slack values for the plurality of paths based on a timing constraint;
    optimizing the physical description by performing a plurality of iterations of:
        selecting a candidate set of paths having negative slack from the plurality of paths in the physical description based on the slack values of the timing profile, the step of selecting including determining that timing of a particular path of the plurality of paths in the physical description having a most negative slack has not improved and excluding the particular path from the candidate set of paths; and
        modifying the physical description based on at least one optimization of a selected path from the candidate set of paths having a most negative slack;
    generating a physical implementation of the circuit design for the IC based on the physical description.

2. The method of claim 1, wherein the step of optimizing comprises:
    maintaining at least one queue each including paths from the candidate set of paths ordered from most negative slack to least negative slack.

3. The method of claim 2, wherein the step of maintaining comprises:
    for a first iteration of the step of optimizing, creating the at least one queue after the candidate set of paths having negative slack have been selected; and
    for each additional iteration of the step of optimizing, updating the at least one queue after the candidate set of paths having negative slack have been selected.

4. The method of claim 2, wherein the at least one queue comprises a plurality of queues, the paths in each of the plurality of queues being part of a respective clock group of a plurality of clock groups in the physical description.

5. The method of claim 1, further comprising:
    excluding at least one additional path in a same clock group as the particular path from the candidate set of paths.

6. The method of claim 1, wherein the step of selecting comprises:
    determining that timing improvement of a particular path of the plurality of paths in the physical description does not satisfy a threshold; and
    excluding the particular path from the candidate set of paths.

7. The method of claim 6, further comprising:
    excluding at least one additional path in a same clock group as the particular path from the candidate set of paths.

8. The method of claim 1, wherein the step of optimizing is performed for the plurality of iterations or until the candidate set of paths is empty.

9. The method of claim 8, wherein the candidate set of paths is reduced in one or more of the plurality of iterations by excluding at least one path where timing has not improved from a previous iteration or where timing improvement from a previous iteration does not satisfy a threshold.

10. The method of claim 1, further comprising:
    re-executing the timing analysis to update the timing profile after one or more iterations of the step of optimizing.

11. A circuit design system, comprising:
    a hardware platform comprising a central processing unit (CPU) and a memory, the memory storing a logical description of a circuit design for an integrated circuit (IC) and a timing constraint; and
    a circuit design tool comprising instructions executable by the CPU in the hardware platform, the circuit design tool configured to:
        place and route the logical description to generate a physical description having a plurality of paths;
        execute a timing analysis to determine a timing profile of the physical description, the timing profile including slack values for the plurality of paths based on a timing constraint;
        optimize the physical description by performing a plurality of iterations of:
            selecting a candidate set of paths having negative slack from the plurality of paths in the physical description based on the slack values of the timing profile;
            determining that timing of a particular path of the plurality of paths in the physical description having a most negative slack has not improved;
            excluding the particular path from the candidate set of paths; and
            modifying the physical description based on at least one optimization of a selected path from the candidate set of paths having a most negative slack;
        generate a physical implementation of the circuit design for the IC based on the physical description.

12. The computer system of claim 11, wherein circuit design tool is configured to:
  exclude at least one additional path in a same clock group as the particular path from the candidate set of paths.

13. The computer system of claim 11, wherein circuit design tool is configured to:
  determine that timing improvement of a particular path of the plurality of paths in the physical description does not satisfy a threshold; and
  exclude the particular path from the candidate set of paths.

14. The computer system of claim 13, wherein circuit design tool is configured to:
  exclude at least one additional path in a same clock group as the particular path from the candidate set of paths.

15. A non-transitory computer readable medium having instructions stored thereon that when executed by a processor cause the processor to perform a method of implementing a circuit design for an integrated circuit (IC), comprising:
  placing and routing a logical description of the circuit design to generate a physical description having a plurality of paths;
  executing a timing analysis to determine a timing profile of the physical description, the timing profile including slack values for the plurality of paths based on a timing constraint;
  optimizing the physical description by performing a plurality of iterations of:
    selecting a candidate set of paths having negative slack from the plurality of paths in the physical description based on the slack values of the timing profile, the step of selecting including determining that timing of a particular path of the plurality of paths in the physical description having a most negative slack has not improved and excluding the particular path from the candidate set of paths; and
    modifying the physical description based on at least one optimization of a selected path from the candidate set of paths having a most negative slack;
  generating a physical implementation of the circuit design for the IC based on the physical description.

16. The non-transitory computer readable medium of claim 15, further comprising:
  excluding at least one additional path in a same clock group as the particular path from the candidate set of paths.

17. The non-transitory computer readable medium of claim 15, wherein the step of selecting comprises:
  determining that timing improvement of a particular path of the plurality of paths in the physical description does not satisfy a threshold; and
  excluding the particular path from the candidate set of paths.

* * * * *